United States Patent
Park (10) Patent No.: US 7,032,024 B1
(45) Date of Patent: Apr. 18, 2006

(54) CONNECTION MANAGEMENT METHOD FOR DEVICES CONNECTED DIGITAL INTERFACE AND COMMAND STRUCTURE THEREFOR

(75) Inventor: Jongwook Park, Yongin (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 990 days.

(21) Appl. No.: 09/629,424

(22) Filed: Jul. 31, 2000

(30) Foreign Application Priority Data

Jul. 29, 1999 (KR) ............................. 1999-31057

(51) Int. Cl.
G06F 15/16 (2006.01)
G06F 3/00 (2006.01)

(52) U.S. Cl. ..................... 709/227; 710/5; 710/38
(58) Field of Classification Search ............. 710/38, 710/39, 240, 301–304, 5; 709/227, 331, 709/332, 333, 228, 231, 232
See application file for complete search history.

(56) References Cited

U.S. PATENT DOCUMENTS

| | | | | |
|---|---|---|---|---|
| 5,088,029 A * | 2/1992 | Koyama | ................... | 710/37 |
| 5,991,520 A * | 11/1999 | Smyers et al. | ............... | 710/120 |
| 6,052,750 A * | 4/2000 | Lea | ............... | 710/72 |
| 6,148,241 A * | 11/2000 | Ludtke et al. | ................. | 700/83 |
| 6,150,953 A * | 11/2000 | Tanaka et al. | ......... | 340/825.37 |
| 6,160,796 A * | 12/2000 | Zou | ............ | 370/257 |
| 6,169,725 B1 * | 1/2001 | Gibbs et al. | ................. | 370/216 |
| 6,182,166 B1 * | 1/2001 | Shklarsky et al. | ............ | 710/33 |
| 6,247,069 B1 * | 6/2001 | Smyers | ............. | 710/8 |
| 6,275,889 B1 * | 8/2001 | Saito | ............... | 710/313 |
| 6,286,071 B1 * | 9/2001 | Iijima | ............. | 710/124 |
| 6,397,277 B1 * | 5/2002 | Kato et al. | ................ | 710/104 |
| 6,429,364 B1 * | 8/2002 | Muraki et al. | ................ | 84/600 |
| 6,466,971 B1 * | 10/2002 | Humpleman et al. | ........ | 709/220 |
| 6,493,769 B1 * | 12/2002 | Kawamura et al. | ............ | 710/3 |
| 6,504,847 B1 * | 1/2003 | Horlander | ................... | 370/431 |
| 6,523,696 B1 * | 2/2003 | Saito et al. | ................. | 709/223 |
| 6,529,969 B1 * | 3/2003 | Inoue | ........................ | 710/33 |
| 6,591,313 B1 * | 7/2003 | Hata et al. | .................... | 710/33 |
| 6,591,419 B1 * | 7/2003 | Barry et al. | .................. | 725/25 |

(Continued)

FOREIGN PATENT DOCUMENTS

EP        0 930 747 A1      7/1999

(Continued)

OTHER PUBLICATIONS

Yamaha Corporation, "Audio and Music Protocol", Retrieved from the World Wide Web, Preliminary proposal, Aug. 1996.*

(Continued)

*Primary Examiner*—David Wiley
*Assistant Examiner*—Yemane M. Gerezgiher
(74) *Attorney, Agent, or Firm*—Sughrue Mion, PLLC (57) ABSTRACT

A connection management method between devices which are connected by a digital interface and the command structure therefor are provided. The connection management method, in a network system where a device for transmitting data using a predetermined data transmission format and a device for receiving data are connected by a predetermined digital interface, includes the step of informing another device of various connection status changes for data transmission flow in the course of transmitting real time data between devices connected by a predetermined digital interface format, as well as the step of informing another device of a connection status change which may occur in any of devices whose connection is established. Accordingly, the other device is able to cope with the possible changes, which allows more efficient management for connection status.

28 Claims, 4 Drawing Sheets

U.S. PATENT DOCUMENTS

| | | | |
|---|---|---|---|
| 6,629,173 B1 * | 9/2003 | Iijima | 710/107 |
| 6,631,435 B1 * | 10/2003 | Lym et al. | 710/305 |
| 6,665,020 B1 * | 12/2003 | Stahl et al. | 348/552 |
| 6,785,720 B1 * | 8/2004 | Seong | 709/220 |
| 6,789,196 B1 * | 9/2004 | Miyano | 713/189 |
| 2001/0028780 A1 * | 10/2001 | Na et al. | 386/46 |

FOREIGN PATENT DOCUMENTS

| | | |
|---|---|---|
| EP | 0 939 529 A2 | 9/1999 |
| EP | 0 971 509 A1 | 1/2000 |
| EP | 1 056 242 A2 | 11/2000 |
| JP | 9-27814 | 1/1997 |
| WO | 97/49057 | 12/1997 |
| WO | 00/72521 A1 | 11/2000 |
| WO | 00/77648 A1 | 12/2000 |

OTHER PUBLICATIONS

Philips Semiconductors, "Digital Video and Audio using IEC 61883", Retrieved from the World Wide Web, undated.*
Trade Association, "AV/C Digital Interface Command Set-General Specification", Version 3.0, published Apr. 15, 1998.*

* cited by examiner

| | MSB | | | | | | | LSB |
|---|---|---|---|---|---|---|---|---|
| OPCODE | CONNECTION MANAGEMENT ($XX_{16}$) | | | | | | | |
| OPERAND [0] | I/O | RESERVED | PLUG NUMBER (6BITS) | | | | | |
| OPERAND [1] | PCR LOCATION (MSB) | | | | | | | |
| ... | ... | | | | | | | |
| OPERAND [4] | PCR LOCATION (LSB) | | | | | | | |

FIG. 5

CONNECTION MANAGEMENT METHOD FOR DEVICES CONNECTED DIGITAL INTERFACE AND COMMAND STRUCTURE THEREFOR

BACKGROUND OF THE INVENTION

1. Field of the Invention

The present invention relates to the field of data transmission control, and more particularly, to a connection management method in which the user is informed of a change in connection management status between devices connected by a digital interface, and a command structure therefor.

2. Description of the Related Art

Household or industrial equipment can be interconnected by a bus of a predetermined digital interface format such as the Institute of Electrical and Electronics Engineers, Inc., (IEEE) 1394 to transmit or receive real-time data to or from each other. For example, when a digital television (DTV), digital video camcorder, a set-top box (STB), and the like are interconnected via the IEEE 1394 to form a network, real time data such as video and audio information is transmitted between these devices.

Figure 1:
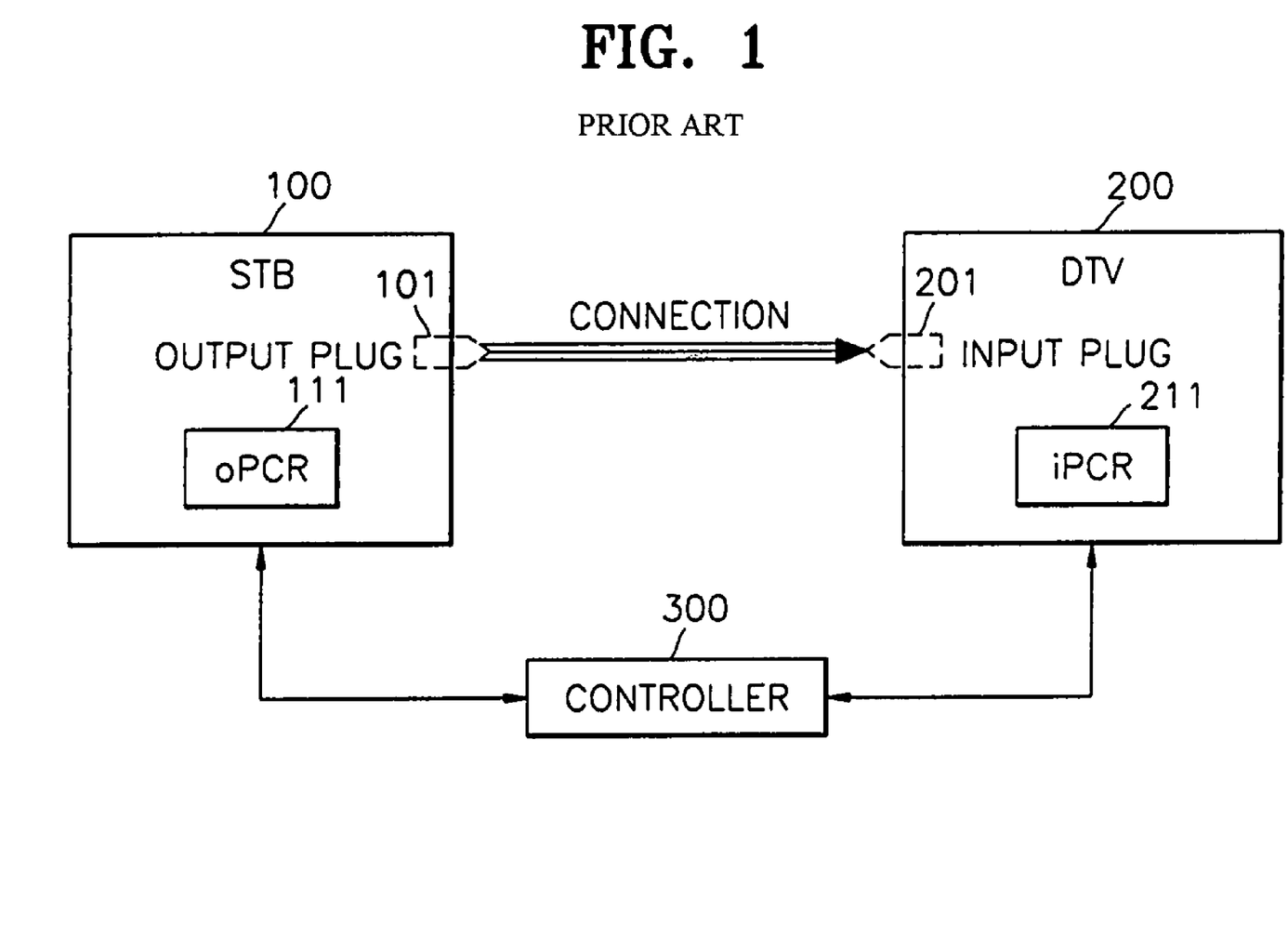
FIG. 1 is a schematic view showing a network system connected via a general IEEE 1394 bus.

As shown in FIG. 1 illustrating a general network system connected via the IEEE 1394, real time data is output from a virtual output plug of a first device and input to an input plug of a second device. In this case, the connection is made conceptually rather than physically. A source device (herein STB 100) includes an output plug 101 for transmitting information and an output plug control register (oPCR) 111 for controlling the flow of information output through the output plug 101. A sink device (herein DTV 200) includes an input plug 201 for receiving information and an input plug control register (iPCR) 211 for controlling the flow of information input to the input plug 201. A control device having a controller 300 can be one of the STB 100 and the DTV 200, or another third-party device, and serves to establish a connection so that a control value of the oPCR 111 and the iPCR 211 can be controlled to transmit data, or terminate the connection.

Accordingly, real time data is transmitted from the output plug 101 to the input plug 201. In this case, the related control information is written in the oPCR 111 and the iPCR 211 corresponding to the output and input plugs 101 and 201, respectively, and the controller 300 reads a value written in the oPCR 111 and the iPCR 211 or writes a control value therein to control the flow of real time data.

Figure 2:
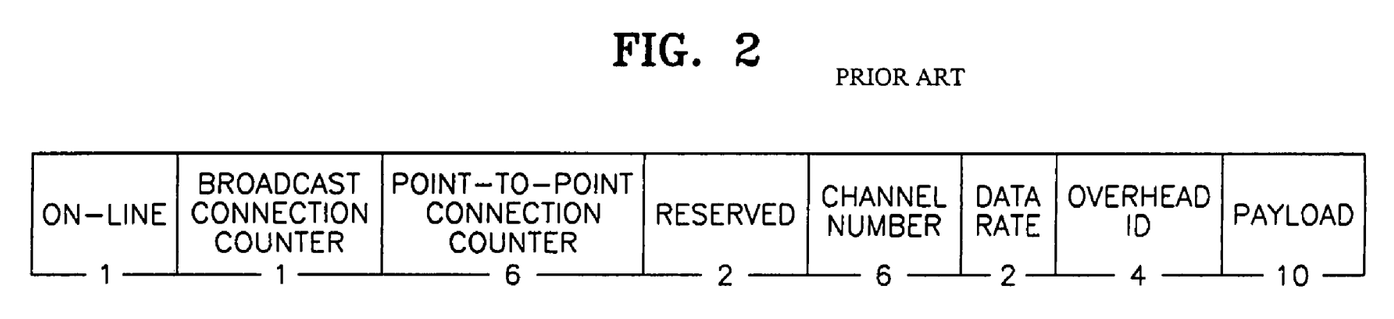
FIG. 2 is a diagram showing the format of the output plug control register (oPCR) shown in FIG. 1.

The control value to be written in the oPCR 111 and the iPCR 211 will be described with reference to FIGS. 2 and 3. The format of the 32-bit oPCR 111 shown in FIG. 2 is described as follows. The numbers below each region denote the number of allotted bits. An on-line region indicates whether a corresponding output plug is on-line ("1" value) or off-line ("0" value). A broadcast connection counter region indicates whether a broadcast-out connection exists ("1" value) or not ("0" value) in the output plug, whereas a point-to-point connection counter region indicates the number of point-to-point (p2p) connections existing in the output plug. A channel number region indicates a channel number which can be used for the output plug to transmit an isochronous data flow when the output plug is activated. A data rate region indicates a transmission speed (or bit rate) required for the output plug to transmit the isochronous packet of an isochronous data flow when the output plug is activated. An overhead ID region indicates the bandwidth required in addition to a bandwidth required for transmitting the payload of an isochronous packet. The payload region indicates the maximum size of isochronous data to be output from the output plug when the output plug is activated.

Figure 3:
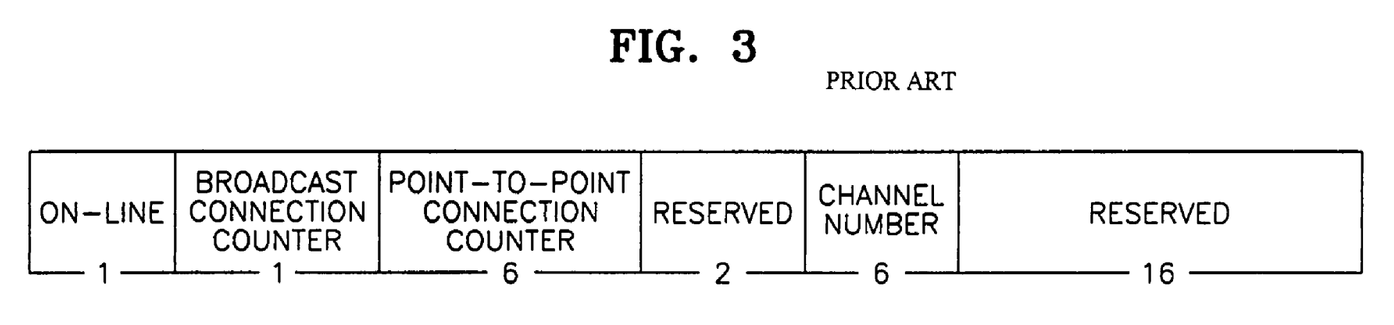
FIG. 3 is a diagram showing the format of the input plug control register (iPCR) shown in FIG. 1.

The format of the 32-bit iPCR 211 shown in FIG. 3 is as follows. The numbers below each region denote the number of allocated bits. An on-line region indicates whether the relevant input plug is on-line ("1" value) or off-line ("0" value). A broadcast connection counter region indicates whether a broadcast-in connection exists ("1" value) or not ("0" value) in the input plug. A point-to-point connection counter region indicates the number of p2p connections existing in the input plug. A channel number region indicates a channel number which can be used for the input plug to receive an isochronous data flow.

Accordingly, if a control device having a controller 300 is allocated a channel value to be used to write each channel value allocated in oPCR 111 and iPCR 211 in channel number shown in FIGS. 2 and 3 and to write other control values (i.e., on-line bit value, connection counter value, etc.) in the oPCR 111 and the iPCR 211, the respective source and sink devices transmit or terminate transmission of the information depending on those values.

As shown in FIGS. 2 and 3, there are two kinds of connections for transmitting information: the p2p connection and the broadcast connection. In the case of the p2p connection, only the control device which establishes a connection can terminate the connection. Thus, in the case where a third-party control device establishes a p2p connection between the source and sink, the source and sink device must each transmit and receive information even if the devices do not desire to do so.

To overcome the above problem, when either device does not desire to receive or transmit data any longer, an algorithm for informing a control device or the connected other device of this fact has been presented by defining a new control command in an audio-video/control command transaction set (AV/C CTS). Specifically, when any change occurs in a device for transmitting or receiving real time data, a new control command is defined in AV/C CTS to indicate this change. According to the AV/C CTS, information is available regarding whether each input plug desires to receive any input information, and whether each output plug desires to output information. Further, this is the case if a signal output from an output plug is transformed. However, when using a command of the AV/C CTS, there is a problem in that changes in other factors for controlling data flow, such as the bandwidth and information as to how many devices are connected to a particular connection, are not available.

SUMMARY OF THE INVENTION

To solve the above problem, it is an object of the present invention to provide a connection management method of indicating various connection status changes related to data transmission flow, such as the status of data transmission and reception, data process capability, and the bandwidth of data, during the transmission of real time data between devices connected by a predetermined digital interface format.

It is another object of the present invention to provide a connection management method for generating a connection management command to transmit various connection status changes for data transmission flow in response thereto.

It is still another object of the present invention to provide a connection management command structure for indicating various connection status changes in data transmission flow in the course of transmitting real time information between devices connected by a predetermined digital interface format.

Accordingly, to achieve the above object of the present invention, there is provided a method of managing a connection between devices in a network system in which one or more devices for transmitting data using a predetermined data transmission format and one or more devices for receiving data are connected by a predetermined digital interface. The connection management method according to the present invention includes the step of informing another device of a connection status change which occurs in any of the devices in which the connection is established.

To achieve another object of the present invention, a connection management method according to the present invention includes the steps of establishing a connection between a device for transmitting information through a predetermined data transmission format and a device for receiving information, both of which are connected by a predetermined digital interface, sending a connection management command for controlling connection management status, and controlling the connection when a response to the connection management status change is received according to the connection management command.

To achieve still another object of the present invention, a connection management command structure, for indicating various connection status changes between devices whose connection is made in a network system where a device for transmitting data using a predetermined data transmission format and a device for receiving data is connected by a digital interface, includes connection register type information which represents an output plug control register within the device for transmitting information or an input plug control register within the device for receiving information, and identification information on an input/output plug at which connection is established.

BRIEF DESCRIPTION OF THE DRAWINGS

The above objects and advantages of the present invention will become more apparent by describing in detail preferred embodiments thereof with reference to the attached drawings in which.

DETAILED DESCRIPTION OF THE INVENTION

Figure 4:
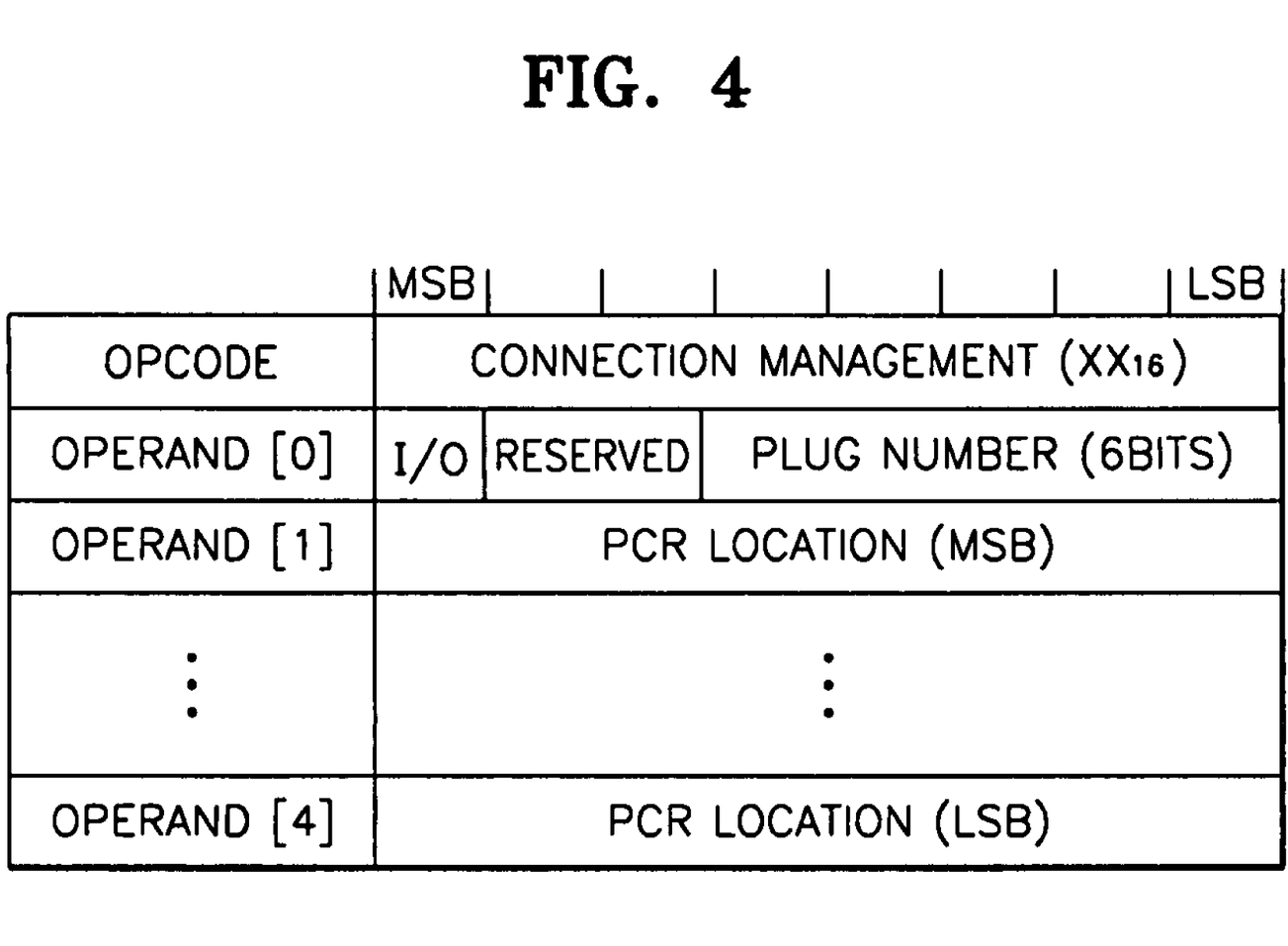
FIG. 4 is a diagram showing a connection management command structure according to the present invention.

According to the present invention, when a change occurs in the control value of the output plug control register (oPCR) and the input plug control register (iPCR) defined in the format of IEC 61883 (Specification of Digital Interface for Electronic AudioNideo Equipment, Part 1, December 1995, HD Digital VCR Conference), which is a data transmission format in devices using the IEEE 1394 format, a connection management command structure for informing a control device or another device connected thereto of this change is defined as shown in FIG. 4. The connection management command structure conforms to a command form defined in the audio-video/control command transaction sets (AV/C CTS).

In FIG. 4, an operation code is defined connection management, and an operand [0] is assigned 1 byte. The 1-byte field includes the most significant bit (MSB) indicative of a connection register type (iPCR/oPCR), the following 1-bit which is reserved, and the remaining 6-bits which are indicative of plug identification information regarding a plug number at which a connection is established. Adding other operands (i.e., operand [1]–operand [4]) to operand [0], allows transmission of various information about connection management.

Specifically, the transmission of an unnecessary response can be prevented by designating only some bit fields in the format of oPCR shown in FIG. 2 (i.e., on-line, broadcast connection counter, point-to-point connection, channel number, data rate, overhead ID, and payload) and by designating only some of bit fields in the format of the iPCR shown in FIG. 3 (i.e., on-line, broadcast connection counter, point-to-point connection, channel number). Thus, when a control device desires to be notified of a change in some bit fields out of 32 bits of the oPCR or the iPCR, a control device has only to set the bit positions of corresponding bit fields to "1" using operands (i.e., operand[1]–operand [4]) to transmit the set operand to a source or sink device employing a notify command. For example, if only the on-line bit field is desired, only the desired bit can be designated. In other words, if a bit position corresponding to the on-line bit field is b0, transmission can be made in such a way as to set only a bit position corresponding to b0 in an operand (e.g., operand[1]) to "1" and to set the remaining bits to "0".

In addition to the factors included in the connection management format shown in FIGS. 2 and 3, e.g., an operand [n] regarding whether the connection is used only for a private purpose can be added in the connection management structure shown in FIG. 4. Accordingly, a first device (i.e., a control device) connected via the IEEE 1394 transmits to a second device (i.e., a source device or a sink device) by designating an output plug or an input plug in the connection management command shown in FIG. 4. In this case, the connection management command can be defined as a new command of a notify command defined in AV/C CTS. There are several types of AV/C CTS commands among which a notify command is included, wherein, if a controller transmits a notify command when it desires to be notified of a future change of a status, a device (also known as a target) in receipt of the notify command initially responds by sending its own current status to a controller, and if the subsequently status changes, the target responds by sending the changed status to the controller.

In the present invention, if a connection management notify command as shown in FIG. 4 is transmitted and a change occurs in any bit of a plug control register designated by the connection management notify command, a first device which receives the notify command retransmits this change as a response to a second device which transmits the notify command. The second device which receives this response reads information about a corresponding plug control register of the other device, checks which bit field is changed, and takes an appropriate measure according to which of the bit fields is changed.

Specifically, in the case in which a device that receives a notify command is a source device having an oPCR, if the on-line bit field among several kinds of bit fields is changed from "1" to "0", it can be interpreted that the source device does not transmit an output or does not desire to do so, so that a control device terminates its connection with the source device. On the other hand, if the on-line bit field is changed from "0" to "1" the source device desires to transmit the output, so that the control device establishes its connection with the source device. For example, if a DTV does not output a signal upon the termination of regular broadcasting programs, then the control device terminates its connection with the DTV.

In the case where a value of broadcast connection counter or p2p connection counter is changed, the value indicates a change in a connection status by overlaying other devices on the already established connection or breaking the overlaid connection. While the value of a p2p connection counter is "1" since a source device having a control device establishes the connection, if this value is changed to "2", it can be regarded that another device receives the information output from the source device. In this case, if a connection is established only for a private purpose, the user can be informed that the information accessed by the user can also be accessed by other people, thereby allowing the user to appropriately cope with this situation.

If the value of a payload representing the bandwidth of output information among bit fields of the oPCR is changed, a control device can take an appropriate measure based on the changed output information bandwidth of a source device and the bandwidth that a sink device is able to input. For example, if the bandwidth of output information transmitted by the source device exceeds the bandwidth that a sink device is able to receive and handle, the control device can terminate a connection of the sink device, thereby preventing the sink device from receiving any further information.

In the same manner, in the case in which a device that receives a notify command is a sink device having an iPCR, if the on-line bit field is changed from "0" to "1", it can be deemed that the sink device desires to receive an input, so that a control device establishes the connection of the sink device. On the other hand, if the on-line bit field is changed from "1" to "0", the sink device can be deemed to not desire an input any longer, so that the control device can break the connection of the sink device. For example, when a video cassette recorder (sink device) ends all recordable regions of the video tape and goes into a blank signal region, the user can be immediately informed of this in order to eject or replace the tape.

Figure 5:
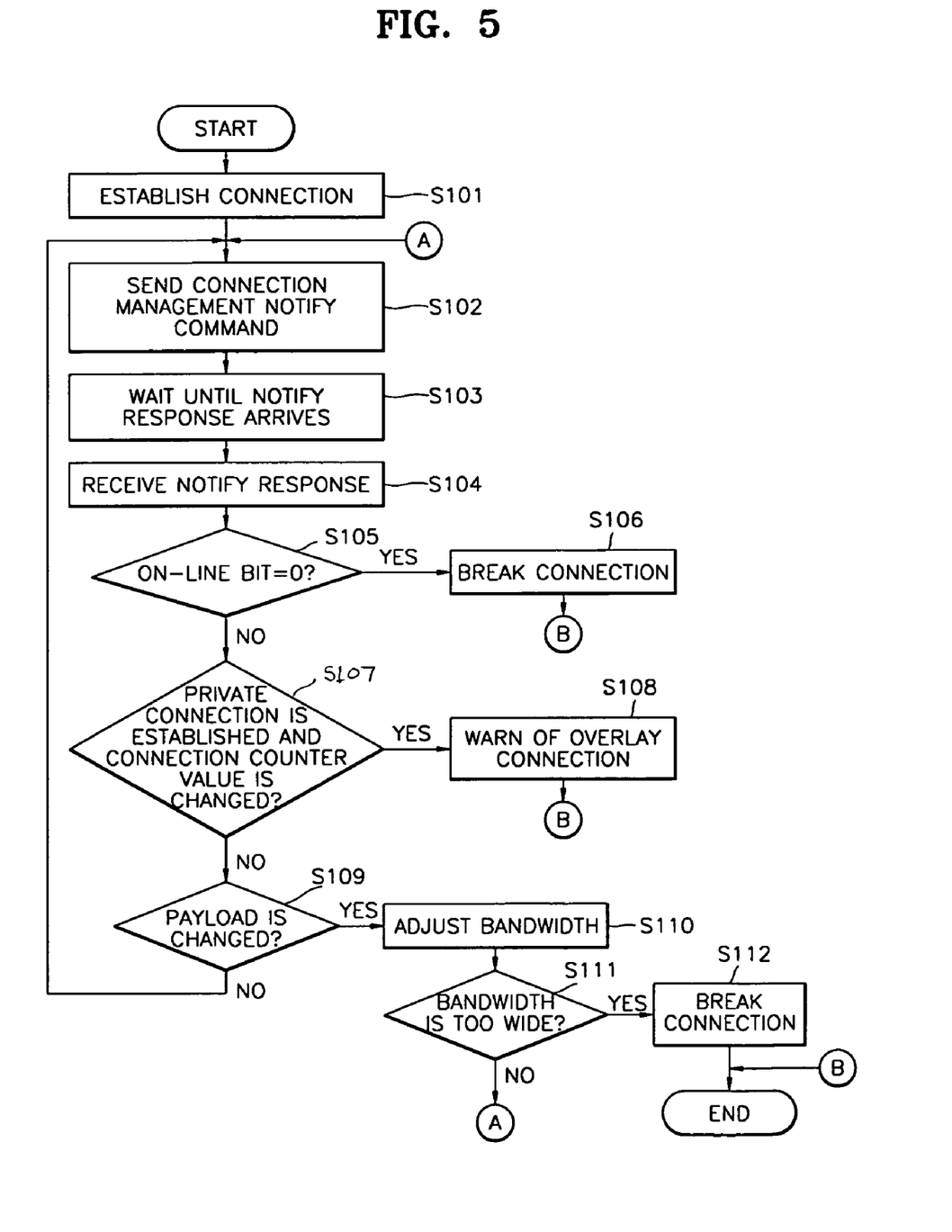
FIG. 5 is a flowchart of a connection management method according to an embodiment of the present invention.

FIG. 5 is a flowchart of a connection management method according to an embodiment of the present invention which is performed by a control device including a controller. Referring to FIG. 5, a connection is established between a source device and a sink device according to the procedure defined in IEC 61883 (step S101). In this case, a connection can be either a point-to-point connection or a broadcast connection. Then, a connection management notify command is sent to the source device and/or the sink device (step S102). While waiting (step S103) until a notify response to a connection management change arrives, after receiving a response to the current status from a device in receipt of the notify command, a notify response to a change in the bit field of the corresponding plug control register of the device in receipt of the notify command is received (step S104).

After a response is received in the step S104, a change in the on-line bit field is initially checked (step S105). If the on-line bit field among bit fields of a corresponding plug control register is changed to "0", a connection is terminated (step S106). On the other hand, if the on-line bit field still remains "1" in the step S105 and a private connection is established, then it is checked whether the value of a broadcast connection counter or a p2p counter has changed (step S107). If a change occurs, the user is informed that it is an overlay connection so that an appropriate measure can be taken (step S108). If there is no change in a connection counter value at the step S107, it is checked whether a payload among bit fields of a corresponding plug control register has changed (step S109), and if a payload is changed, a bandwidth is adjusted (step S110). Then, it is checked whether the adjusted bandwidth can be accepted by the sink device for inputting data (step S112). In this case, if the adjusted bandwidth is too wide, the connection of the sink device is terminated (step S112), otherwise, the step S102 is performed so that a connection management command is transmitted.

According to the present invention, a connection is allowed to be terminated when one of a plurality of devices connected by a digital interface does not desire to transmit output nor receive input information any more. Therefore, there is no waste in the bandwidth due to the establishment unnecessary connections, and only the required bandwidth is used, which enhances the efficiency of bandwidth use.

Further, in the present invention, one device can be immediately notified of several types of status changes (e.g., status of data transmission and reception and data process capability) which may occur in the data processing by another device, thereby allowing the user to promptly understand the status changes which occur inside the connected devices, and to cope with these changes.

In addition, the present invention can indicate changes in the number of sink devices connected to the source device and in the bandwidth that the source device and the sink device are able to output and input, respectively, as well as information on whether a source device desires to transmit data or not. For example, if the number of sink devices connected to a source device is increased, the user is informed of this change, so that if another device does not desire to be connected thereto, the connection of another device is not allowed. Thus, this allows a more efficient connection status management.

What is claimed is:

1. A method of managing a connection between plurality of devices in a network system, wherein a first device for transmitting data using a predetermined data transmission format and a second device for receiving the data are connected by a predetermined digital interface through a connection established by a control device, the method comprising:

(a) transmitting a connection management command from a control device to at least one of the first device and the second device, wherein the connection management command comprises connection register information which specifies an output plug control register within the first device for transmitting the data or an input plug control register within the second device for receiving the data, identification information which specifies an input or output plug at which a connection is established, and an operand which specifies at least one connection status parameter bit field of the output plug control register of the first device or the input plug control register of the second device and indicates that the control device desires to be notified of a future change of the connection status parameter bit field; and (b) transmitting from the at least one of the first and second devices a response to the connection management command informing the control device of a change in the connection status parameter bit field which occurs in the at least one of the first and second devices, wherein the control device is one of the first device, the second device and a third device.

2. The method of claim 1, wherein the control device is the third device which established the connection between the first and second devices.

3. The method of claim 1, wherein the predetermined digital interface is an IEEE 1394 format and the predetermined data transmission format is an IEC 61883 format.

4. The method of claim 1, wherein the output plug control register and the input plug control register are registers for controlling a connection defined in an IEC 61883 format.

5. The method of claim 1, wherein the connection status parameter bit field is a bit field representing on-line or off-line of the first device for transmitting data.

6. The method of claim 1, wherein the connection status parameter bit field is a bit field representing on-line or off-line is changed in the second device for receiving data.

7. The method of claim 1, wherein the change in the connection status parameter bit field is a change in a payload bit field resulting from a change in bandwidth of output information in the first device for transmitting information.

8. The method of claim 1, wherein the connection status parameter bit field is a connection counter bit field which changes depending on a change in the number of devices for receiving information from the first device.

9. The method of claim 8, further comprising preventing additional devices from receiving information from the first device, if the number of devices for receiving information from the first device is increased to more than the second device.

10. A connection management method comprising the steps of:
(a) establishing a connection between a first device for transmitting information using a predetermined data transmission format and a second device for receiving the information, wherein said first and second devices are connected by a predetermined digital interface;
(b) transmitting a connection management command for controlling a connection management status to at least one of the first and second devices, wherein the connection management command comprises connection register information which specifies an output plug control register within the first device for transmitting the information or an input plug control register within the second device for receiving the information, identification information which specifies an input or output plug at which a connection is established, and an operand which specifies at least one connection status parameter bit field of the output plug control register of the first device or the input plug control register of the second device and indicates that the control device desires to be notified of a future change of the at least one connection status parameter bit field; and
(c) controlling the connection between the first and second devices when a response to the connection management command indicating a change in the connection status parameter bit field is received.

11. The method of claim 10, wherein the predetermined digital interface is an IEEE 1394 format, and the predetermined data transmission format is an IEC 61883 format.

12. The method of claim 10, wherein, in the step (b), the connection management command complies with a notify command form of a format of audio-video/control command transaction sets.

13. The method of claim 10, wherein the input and output plug control registers are connection control registers defined by an IEC 61883 format.

14. The method of claim 10, wherein, in the step (c), if the response to the connection management command indicates a change of a bit field representing an on-line or off-line status the first device for transmitting information, a connection is broken or established with the first device.

15. The method of claim 10, wherein, in the step (c), if the response to the connection management command indicates a change in a bit field representing an on-line or off-line status in the second device for receiving information, a connection is broken or established with the second device.

16. The method of claim 10, wherein, in the step (c), if the response to the connection management command indicates a change in a payload bit field resulting from a change in a bandwidth of output information in the first device for transmitting information, a connection is terminated or established based on whether the bandwidth of the output information can be accepted by the second device.

17. The method of claim 10, wherein, in the step (c), if the response to the connection management command indicates a change in a connection counter bit field due to an additional device for receiving information in the first device for transmitting information, a connection of the additional device is broken or established.

18. The method of claim 17, wherein the step (c) further comprises the step of informing a user in order to stop devices other than the second device from receiving information, if the number of the devices for receiving information from the first device for transmitting information is changed and a private connection is established.

19. A method for indicating a connection status change between a plurality of devices having a connection which is established in a network system wherein a first device for transmitting data through a predetermined data transmission format and a second device for receiving the data are connected by a predetermined digital interface, the method comprising generating a connection management which comprises:
connection register information which specifies an output plug control register within the first device for transmitting the data or an input plug control register within the second device for receiving the data;
identification information which specifies an input or output plug at which a connection is established; and
an operand for which specifies at least one connection status parameter bit field of the output plug control register or the input plug control register, wherein command structure indicates that a control device desires to be notified of a future change of the at least one connection status parameter bit field.

20. The method of claim 19, wherein the connection management command complies with a format of audio-video/control command transaction sets.

21. The method of claim 19, wherein the predetermined digital interface is an IEEE 1394 format, and the predetermined data transmission format is an IEC 61883 format.

22. The method of claim 19, wherein the connection management command further comprises an operand indicating whether the connection is for a private purpose.

23. The method of claim 1, wherein the connection status parameter bit field is one of an on-line bit field, a broadcast connection counter bit field, a point-to-point connection counter bit field, a channel number bit field, a data rate bit field, an overhead ID bit field and a payload bit field of the output plug control register of the first device.

24. The method of claim 1, wherein the connection status parameter bit field is one of an on-line bit field, a broadcast connection counter bit field, a point-to-point connection counter bit field and a channel number bit field of the input plug control register of the second device.

25. The method of claim 10, wherein the connection status parameter bit field is one of an on-line bit field, a broadcast connection counter bit field, a point-to-point connection counter bit field, a channel number bit field, a data rate bit field, an overhead ID bit field and a payload bit field of the output plug control register of the first device.

26. The method of claim 10, wherein the connection status parameter bit field is one of an on-line bit field, a broadcast connection counter bit field, a point-to-point connection counter bit field and a channel number bit field of the input plug control register of the second device.

27. The command structure of claim 19, wherein the connection status parameter bit field is one of an on-line bit field, a broadcast connection counter bit field, a point-to-point connection counter bit field, a channel number bit field, a data rate bit field, an overhead ID bit field and a payload bit field of the output plug control register of the first device.

28. The command structure of claim 19, wherein the connection status parameter bit field is one of an on-line bit field, a broadcast connection counter bit field, a point-to-point connection counter bit field and a channel number bit field of the input plug control register of the second device.

\* \* \* \* \*